(12) United States Patent
Hirai et al.

(10) Patent No.: US 6,229,602 B1
(45) Date of Patent: *May 8, 2001

(54) PHOTOMETERING APPARATUS

(75) Inventors: Isamu Hirai, Tokyo; Tadahisa Ohkura, Saitama, both of (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,613

(22) Filed: Oct. 27, 1998

(30) Foreign Application Priority Data

Oct. 29, 1997 (JP) .................................. 9-296776

(51) Int. Cl.$^7$ ....................................... G01J 1/00
(52) U.S. Cl. ........................ 356/213; 356/218; 356/222
(58) Field of Search .................. 356/124, 124.5, 356/125, 126, 127, 73, 328, 334, 213, 218, 222

(56) References Cited

U.S. PATENT DOCUMENTS

| 4,929,824 | 5/1990 | Miyazaki ........................... 256/222 |
| 5,097,281 | 3/1992 | Yamano et al. . | |
| 5,112,125 | * 5/1992 | Neumann ............................... 356/73 |
| 5,146,258 | 9/1992 | Bell et al. ............................ 356/222 |
| 5,434,640 | 7/1995 | Takagi et al. . | |
| 5,576,799 | 11/1996 | Iwasaki .............................. 396/233 |
| 5,862,419 | * 1/1999 | Goto et al. .......................... 396/121 |
| 6,014,524 | * 1/2000 | Suzuki et al. ....................... 396/121 |

FOREIGN PATENT DOCUMENTS 0483761   5/1992   (EP) .
2254705   2/1999   (GB) .

* cited by examiner

Primary Examiner—Frank G. Font
Assistant Examiner—Roy M. Punnosse
(74) Attorney, Agent, or Firm—Greenblum & Bernstein, P.L.C.

(57) ABSTRACT

A photometering apparatus has a photometering apparatus having a plurality of photometering systems for measuring the brightness of an object. photometering system includes: a light receiving device in which different parts of an object are detected by a plurality of split photodetectors whose light receivers each comprise a detection area which is made separate by at least one insensitive area; a photometering optical system for projecting the image of the object onto the light receiving device; wherein the image of the object formed on the at least one insensitive area of one of the plurality of split photodetectors of one of the plurality of photometering systems is formed on the plurality of detection areas of another of the plurality of split photodetectors of another of the plurality of photometering systems.

16 Claims, 4 Drawing Sheets

PHOTOMETERING APPARATUS

BACKGROUND OF THE INVENTION

1. Field of the Invention

The present invention relates to a photometering apparatus having a split type photodetector.

2. Description of the Related Art

In a known photometering apparatus in a camera, a light receiving surface of a photo sensor is located in a predetermined focal plane of an object image or in the vicinity thereof, so that the brightness of the object image formed on the light receiving surface can be detected by the photodetector. In a known photometering apparatus having a split type photodetector, the light receiving surface is split into a plurality of detection sections (areas) which detect the brightness of the object image incident thereupon.

In a split type photodetector, the light receiving surface is split into a plurality of detection areas corresponding to a desired number of split measurement zones. To prevent 'crosstalk', or due to the wiring arrangement of electrical leads, the split measurement zones are separated by an insensitive area. FIG. 6 shows an example of a known split type photodetector. In FIG. 6, the split type photodetector 71 is provided with six split detection areas 73A through 73F which are separated by an insensitive band 75.

Hence, it is impossible to detect the brightness of the object image formed on the insensitive band 75; if the bright object image is made incident on the insensitive band, the object image cannot be detected, and hence the whole object may be recognized as a dark object.

If the insensitive band 75 is narrow, 'crosstalk' tends to occur, thus resulting in a reduced measurement accuracy. Namely, the measurement accuracy is reduced by the insensitive band 75 as the split type photodetector 71 becomes small or the number of the split detection areas is increased.

SUMMARY OF THE INVENTION

The object of the present invention is to provide a multi-measurement or split measurement type photometering apparatus in which an immeasurable area is made as small as possible, or at least reduced.

To achieve the object mentioned above, according to the present invention, there is provided a photometering apparatus having a plurality of photometering systems for measuring the brightness of an object, wherein each photometering system includes: a light receiving device in which different parts of an object are detected by a plurality of split photodetectors whose light receivers each comprise a detection area which is made separate by at least one insensitive area; a photometering optical system for projecting the image of the object onto the light receiving device; wherein the image of the object formed on the at least one insensitive area of one of the plurality of split photodetectors of one of the plurality of photometering systems is formed on the plurality of detection areas of another of the plurality of split photodetectors of another of the plurality of photometering systems.

Preferably, the photometering apparatus includes a pair of photometering systems, wherein the ratios of the vertical and horizontal dimensions of the detection area of the plurality of split photodetectors and at least one insensitive area are the same.

Preferably, the photometering optical system of one of the plurality of photometering systems includes a photometering lens which forms an image on the light receiving portion of the one of the plurality of photometering systems at a different magnification to a photometering lens of the photometering optical system of another of the plurality of photometering systems.

Preferably, the split photodetectors have the same shape and size.

Preferably, the ratios of the vertical and horizontal dimensions of each detection area of the split photodetectors and at least one insensitive area are the same.

Preferably, the magnification of each photometering system is such that substantially all of the image of the object formed on the at least one insensitive area of the split photodetector of one of the plurality of photometering systems is formed on at least one the detection area of the other the split photodetector of another of the plurality of photometering systems.

According to another aspect of the present invention, there is provided a photometering apparatus having a plurality of photometering systems for measuring the brightness of an object, wherein each photometering system includes: a split photodetector having light receiving portions with comprising a detection area which is made separate by an insensitive area; wherein the photometering optical system of one of the plurality of photometering systems comprises a photometering lens which forms an image on the light receiving portion of the one of the plurality of photometering systems at a different magnification to a photometering lens of the photometering optical system of another of the plurality of photometering systems; and wherein the magnification of each photometering system is such that substantially all of the object image formed on the insensitive area of the split photodetector of one of the plurality of photometering systems is formed on at least one detection area of the other the split photodetector of another of the plurality of photometering systems.

Preferably, the split photodetectors have the same shape and size.

Preferably, the photometering apparatus includes a pair of photometering systems, wherein the ratios of the vertical and horizontal dimensions of each the detection area of the split photodetectors and the insensitive areas are the same.

Preferably, the magnification of one of the plurality of photometering systems is less than the magnification of another of the plurality of photometering systems.

Preferably, the photometering apparatus is provided between an image erection system and an eyepiece in a finder optical system of a single lens reflex camera.

According to another aspect of the present invention, there is provided a photometering apparatus, having a plurality of photometering systems for measuring the brightness of an object, wherein each the photometering system comprises: a light receiving device which receives light carrying the object image; and a photometering optical system for projecting the object image onto the light receiving device, the light receiving device receiving object light of different portions of the object; wherein the photometering optical systems have different magnifications.

According to another aspect of the present invention, photometering apparatus including: a pair of split photodetectors for detecting different parts of an object image each of the split photodetectors being provided with a light receiver having detection areas which are separated by an insensitive area; the ratios of the vertical and horizontal dimensions of the insensitive area of one of the pair of split photodetectors and the detection areas of the other of the pair of split photodetectors are the same.

The present disclosure relates to subject matter contained in Japanese Patent Application No. 09-296776 (filed on Oct. 29, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

In the illustrated embodiment, a photometering apparatus is discussed. The photometering apparatus has a pair of photometering systems 10 and 20 provided with photometering optical systems 113 and 123 (e.g., image forming lenses) that form object images on split photodetectors 11 and 21 at different magnifications.

Figure 1:
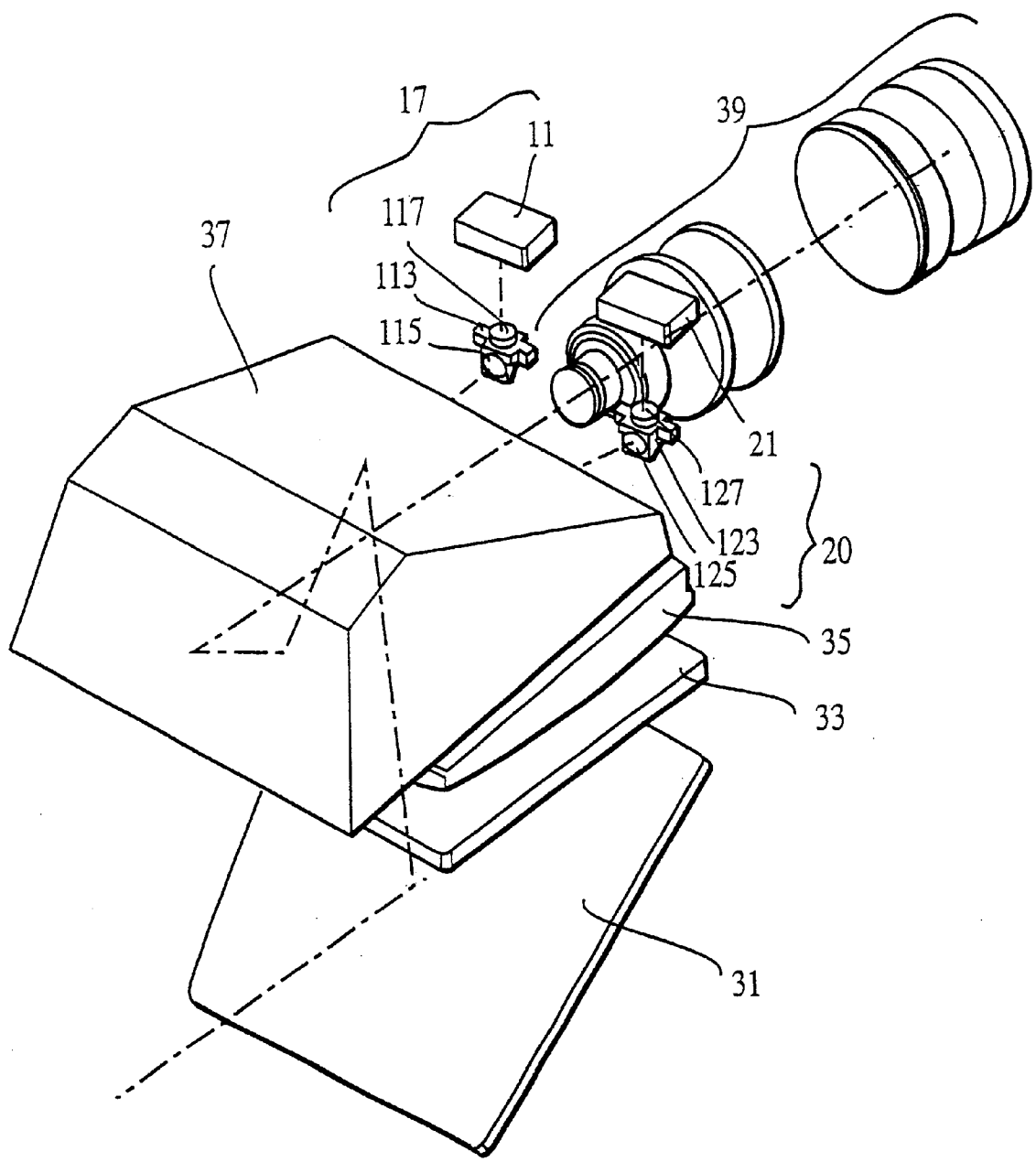
FIG. 1 is an exploded perspective view of a photometering apparatus applied to a single lens reflex camera, according to an embodiment of the present invention.

In FIG. 1 which shows a photometering apparatus applied to a single lens reflex camera according to the present invention; light which carries an object image through a photographing lens is reflected by a main mirror 31, is transmitted through a focusing screen 33 which is located at a position optically equivalent to a film surface and a condenser lens 35, and is made incident on a trapezoidal prism 37 which forms an image erection optical system which erects the inverted object image. A large part of the object light reflected by and emitted from the trapezoidal prism 37 is transmitted through a finder magnifier (eyepiece) 39 and is received by a photographer's eye.

The first and second split photodetectors 11 and 21 each constitute a photometering system, on opposite sides of the finder magnifier 39. The split photodetectors 11 and 21 are provided with photometering systems 113 and 123 through which the object light emitted from the trapezoidal prism 37 is made incident on the light receiving surfaces of the photodetectors 11 and 21 to form object images. The photometering optical systems 113 and 123 are each composed of a first photometering lens 115 or 125, a mirror (not shown) which deflects the light path by 90° in the upward direction (with respect to the camera body), and a second photometering lens 117 or 127 as an image forming lens, in this order from the trapezoidal prism (37) side.

Figures 2, 3:
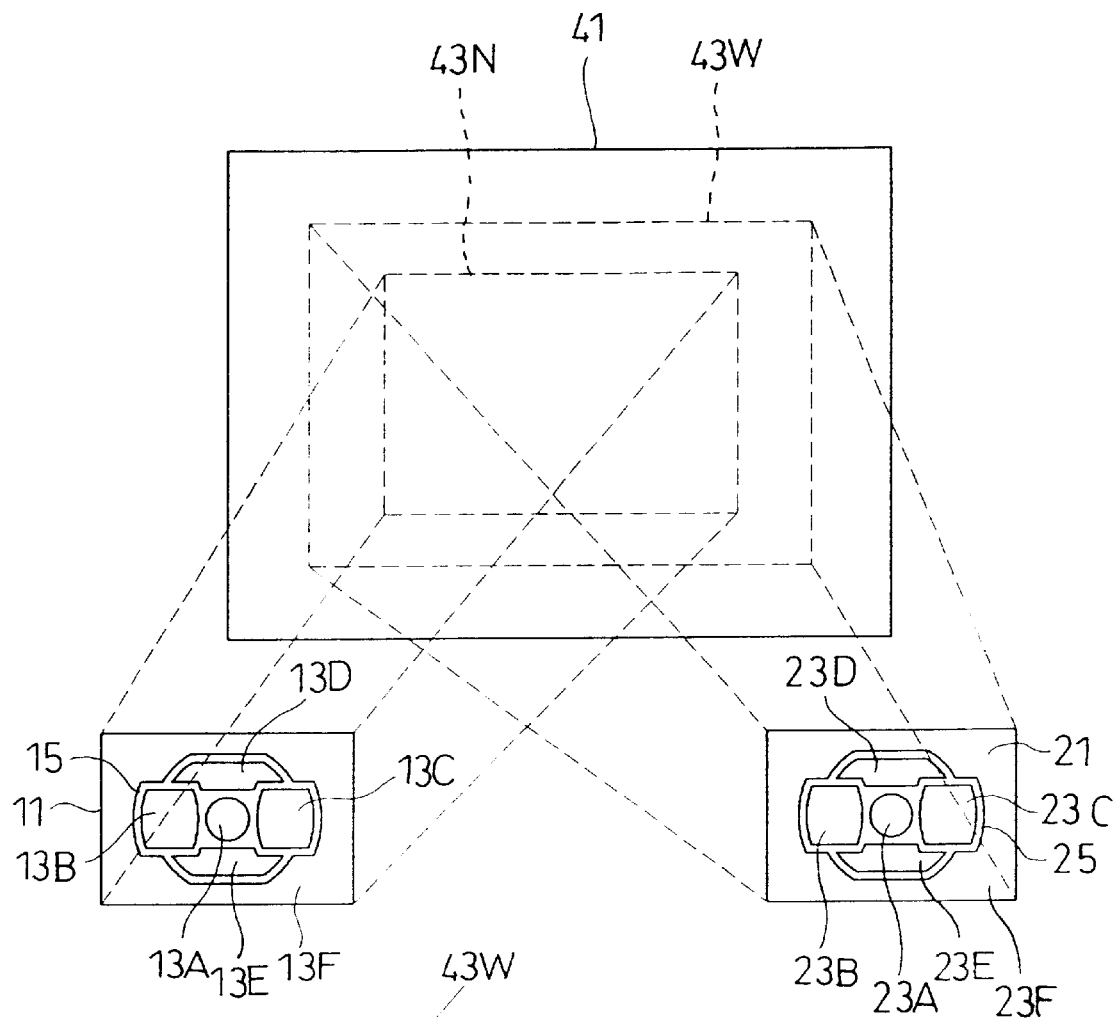
FIG. 2 is an explanatory view of a relationship between a pair of detection areas of a split photodetector and an image surface in the photometering apparatus shown in FIG. 1.
FIG. 3 is a schematic view of a pair of detection areas of a split photodetector and an insensitive area, and a object image area which is overlapped at the same magnification of an object image.

According to one of the most significant features of the embodiment illustrated in FIG. 2, the split photodetectors 11 and 21 are identical and have the same pattern of split detection area. The light receiving surfaces of the split photodetectors 11 and 21 are each provided with six split detection areas which are separated by an insensitive area. Namely, the first split photodetector 11 is composed of a central detection area 13A, a pair of right and left detection areas 13B and 13C on opposite sides of the central detection area 13A, a pair of upper and lower detection areas 13D and 13E on opposite sides of the central detection area 13A, a peripheral detection area 13F, and an insensitive area 15 which separates the detection areas 13A through 13F. Likewise, the second split photodetector 21 is composed of split detection areas 23A through 23F and an insensitive area 25, identical in shape to the detection areas 13A through 13F so and the insensitive area 15, respectively.

FIG. 2 shows a relationship between the picture surface (whole object area) 41 of the camera and the detection areas 43N and 43W corresponding to the object area formed on the light receiving surfaces of the split photodetectors 11 and 21. As can be seen in FIG. 2, the object image within the relatively narrow detection area 43N of the picture surface 41 is formed on the first photodetector 11, and the object image within the detection area 43W which is larger than the detection area 43N is formed on the second photodetector 21. The larger detection area 43W is projected onto the second photodetector 21 at a magnification less than that of the detection area 43N projected onto the first photodetector 11. Namely, the object images are formed on the first photodetector 11 and the second photodetector 21 at a high magnification and a low magnification, respectively. Consequently, the magnification of the photometering optical system 113 is higher than the magnification of the photometering system 123, or the focal length of the photometering optical system 113 is longer than the focal length of the photometering optical system 123.

Among the object images formed on the split photodetectors 11 and 21, the brightness of the object images formed on the split detection areas 13A through 13F and 23A through 23F can be detected, but the brightness of the object images formed on the insensitive areas 15 and 25 cannot be detected. In view of this problem, according to one of the most significant features of the illustrated embodiment, the portions of the object images that cannot be detected or measured, within the wide and narrow detection areas 43W and 43N, are made as small as possible.

FIG. 3 shows a relationship between the detection areas 43N, 43W and the split detection areas 13A through 13F and 23A through 23F of the split photodetectors 11 and 21, respectively. In FIG. 3, the magnification of the object images formed on the split photodetectors 11 and 21 are modified in accordance with the ratio of the size of the images on the picture surface 41. As can be seen in FIG. 3, a large part of the insensitive area 25 which cannot be detected by the second split photodetector 21 is covered (overlapped) by the split detection areas 13A through 13F of the first split photodetector 11. Likewise, a large part of the insensitive area 15 which cannot be detected by the first split photodetector 11 is covered (overlapped) by the split detection areas 23A through 23F of the second split photodetector 21. Thus, the insensitive portions which cannot be detected or measured by the split photodetectors are only those hatched in FIG. 3.

As may be understood from the foregoing, according to the illustrated embodiment, since the split detection areas 13A through 13F of the first split photodetector are overlapped on the insensitive area 25 of the second split photodetector while the magnifications of the object images to be formed on a pair of split photodetectors are different, the area of the insensitive portions can be reduced by using the measurements of the split detection areas 13A through 13F and 23A through 23F of the split photodetectors 11 and 21, thus resulting in a precise and fine measurement. Moreover, since the split photodetectors 11 and 21 are identical, not only can the number of the elements be reduced, but also the structure and the assembling operation of the apparatus can be simplified.

In the above-mentioned embodiment, the improvement is chiefly addressed to the shape and arrangement of the split detection areas. FIGS. 4A, 4B and 5A, 5B show different embodiments in which significance is placed on the realization of smaller insensitive areas of a pair of split photodetectors.

Figure 4A:
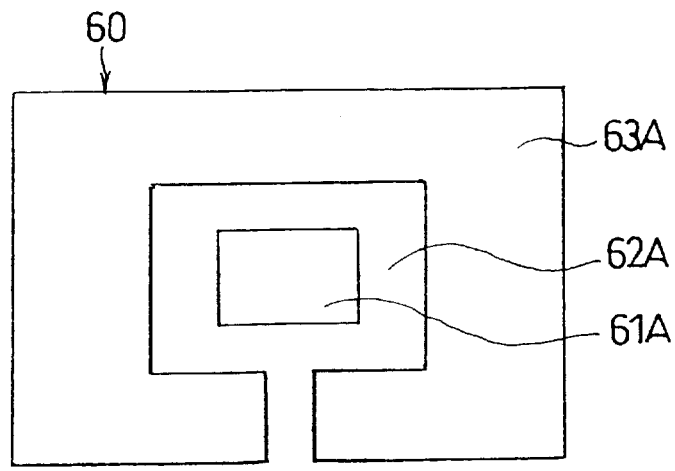
FIGS. 4A and 4B are schematic views of a detection area and an insensitive area according to another embodiment of the present invention, respectively.

In FIG. 4A, the split photodetector 60 is a two-split type photodetector which is provided with a central detection area 61A and a peripheral detection area 63A which surrounds the central detection area 61A. The detection areas 61A and 63A are isolated by an insensitive area 62A. The ratios of the vertical and horizontal dimensions of the peripheral detection area 63A and the insensitive area 62A are the same.

Figure 4B:
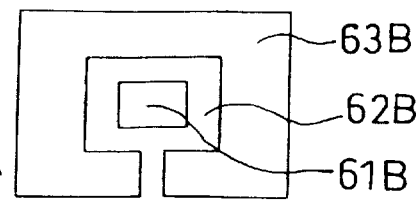

In FIGS. 4A and 4B, a pair of split photodetectors 11 and 21 shown in FIGS. 1 through 3 are replaced with the split photodetectors 60 to show the relationship between the detection areas and the insensitive areas. Assuming that the split photodetector 60 shown in FIG. 4A corresponds to the second split photodetector 21, the split detection areas and the insensitive area of the split photodetector 60 corresponding to the first split photodetector 11 are as shown in FIG. 4B. As shown in FIGS. 4A and 4B, the detection area 63B of high magnification is substantially the same as the insensitive area 62A of low magnification. Namely, if the magnification of the photometering lens is appropriately set, the object image formed on the insensitive area 62A on the low magnification side can be substantially overlapped on or identical to the object image formed on the detection area 63B on the high magnification side. Thus, a split measurement can be carried out, owing to an absence of an immeasurable area.

Figure 5A:
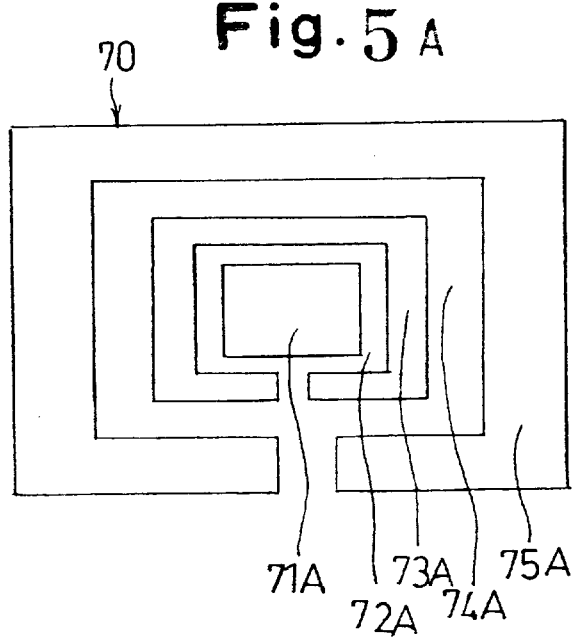
FIGS. 5A and 5B are schematic views of a detection area and an insensitive area according to yet another embodiment of the present invention, respectively.
Figure 5B:
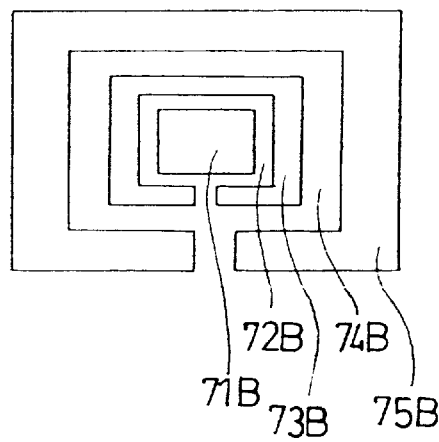
Figure 6:
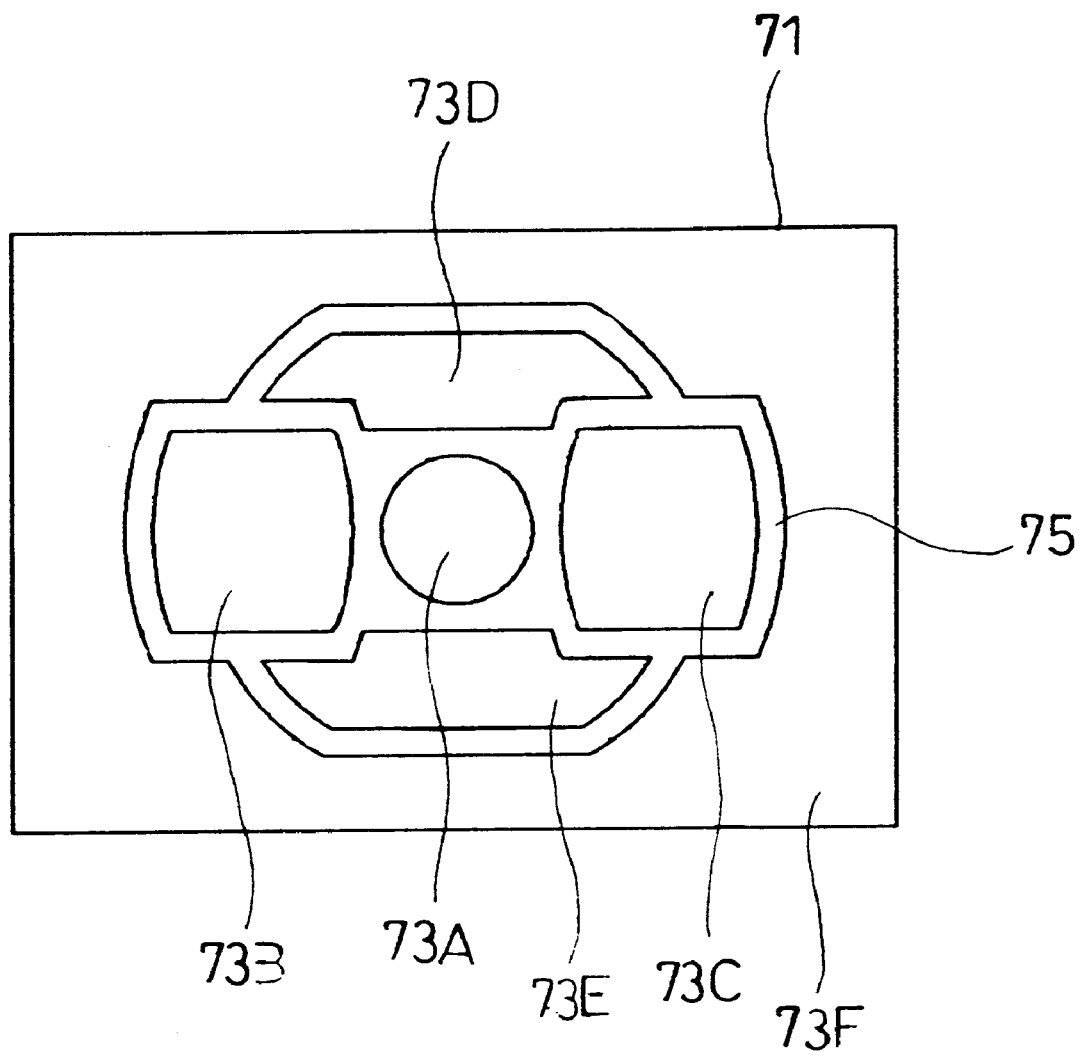
FIG. 6 is an explanatory view of split detection areas and an insensitive area in a known photometering apparatus.

The split photodetector 70 shown in FIGS. 5A and 5B is a three-split type photodetector which constitutes a central detection area 71A, an intermediate detection area 73A which surrounds the central detection area 71A, and a peripheral detection area 75A which surrounds the intermediate detection area 73A. The detection areas 71A and 73A are isolated by an insensitive area 72A, and the detection areas 73A and 75A are isolated by an insensitive area 74A. The ratios of the vertical and horizontal dimensions of the peripheral detection area 75A and the intermediate detection area 73A are the same as the insensitive areas 74A and 72A, respectively.

In FIGS. 5A and 5B, a pair of split photodetectors 11 and 21 shown in FIGS. 1 through 3 are replaced with the split photodetectors 70 to show the relationship between the detection areas and the insensitive areas. Assuming that the split photodetector 70 on the low magnification side, shown in FIG. 5A corresponds to the second split photodetector 21, the split detection areas 71B, 73B and 75B and the insensitive areas 72B and 74B of the split photodetector 70 on the high magnification side, corresponding to the first split photodetector 11 are as shown in FIG. 5B. As shown in FIGS. 5A and 5B, the detection areas 75B and 73B of high magnification substantially overlaps, or is identical to, the insensitive areas 74A and 72A of low magnification. Namely, if the magnification of the photometering optical systems 113 and 123 is appropriately set, the object image formed on the insensitive areas 74A and 72A on the low magnification side can be substantially the same as the object image formed on the detection areas 75B and 73B on the high magnification side. Thus, a split measurement can be carried out, owing to an absence of an immeasurable area.

As may be understood from the foregoing, in the embodiments illustrated in FIGS. 4A, 4B and 5A and 5B, since the object light incident on the insensitive area of one of the photodetectors is identical to the object light incident on the detection areas of the other photo detector, the entire object light incident on the light receivers of the split photodetector 60 or 70 can be effectively used for the measuring operation.

In the embodiments illustrated in FIGS. 4A, 4B and 5A, 5B, the pair of photodetectors are identical to each other, and the magnifications (focal lengths) of the photometering lenses are different, so that there is no insensitive portion. Alternatively, it is possible to eliminate the insensitive portion by making the size of the split photodetectors different from one another as shown in FIGS. 4A, 4B or 5A, 5B.

Although two split photodetectors are used in the illustrated embodiments, the number of the photodetectors is not limited to two. More than two photodetectors can be used. The structure of the photometering optical system is not limited to that of the illustrated embodiments. Moreover, the number, arrangement and shape, of the split detection areas of each photodetector are not limited to those in the illustrated embodiments.

As may be understood from the above discussion, according to the present invention, since the magnifications of a plurality of split type photometering systems are different, the insensitive area of one of the photometering systems can be detected by the detection areas of another photometering system. Consequently, the brightness of the entire object can be split-measured.

Moreover, according to another aspect of the present invention, since the object image portion formed on the insensitive area of one of the split photodetectors having light receiving portions provided with split detection areas separated by the insensitive area is formed on the detection areas of the other split photodetector, almost all of the portions of the object formed on one of the split photodetectors can be measured, thus resulting in a precise and fine measurement of the brightness of the object.

Furthermore, since the identical photodetectors can be used, not only can the number of elements be reduced, but also the structure or assembling operation of the apparatus can be simplified.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photometering apparatus having a plurality of photometering systems that measure a brightness of an object, each of said photometering system comprising:

a photometering optical system that directs a bundle of rays of light from the object; and a light receiving device that receives said bundle of rays of light and forms an image of the object, said light receiving device comprising a plurality of detection areas on which said image of the object is formed, and that is made separate by at least one insensitive area, said plurality of photometering systems are arranged to form a part of said image, which is formed on an insensitive area of one light receiving device, on at least one detection area of another light receiving device.

2. The photometering apparatus according to claim 1, wherein said photometering apparatus comprises a pair of photometering systems, wherein the ratios of the vertical and horizontal dimensions of said detection areas of said light receiving devices and said at least one insensitive area are the same.

3. The photometering apparatus according to claim 1, wherein said photometering optical system of one of said plurality of photometering systems comprises a photometering lens which forms an image on said light receiving device of said one of said plurality of photometering systems at a different magnification to a photometering lens of said photometering optical system of another of said plurality of photometering systems.

4. The photometering apparatus of claim 3, wherein said detection area and said insensitive area of each light receiving device of said plurality of photometering systems have the same shape and size.

5. The photometering apparatus according to claim 4, wherein the ratios of the vertical and horizontal dimensions of each said detection area of said split photodetectors and said at least one insensitive area are the same.

6. The photometering apparatus according to claim 5, wherein the magnification of each photometering system is such that substantially all of the image of said light receiving device of one of said plurality of photometering systems is formed on at least one said detection area of the other said light receiving device of another of said plurality of photometering systems.

7. The photometering apparatus according to claim 1, wherein the ratios of the vertical and horizontal dimensions of each said detection area of one of said light receiving devices and said at least one insensitive area of said split photodetectors are the same.

8. A photometering apparatus having a plurality of photometering systems for measuring the brightness of an object, wherein each said photometering system comprises:
   a split photodetector having light receiving portions with comprising a detection area which is made separate by an insensitive area;
   wherein said photometering optical system of one of said plurality of photometering systems comprises a photometering lens which forms an image on said light receiving portion of said one of said plurality of photometering systems at a different magnification to a photometering lens of said photometering optical system of another of said plurality of photometering systems; and
   wherein the magnification of each photometering system is such that substantially all of the object image formed on said insensitive area of said split photodetector of one of said plurality of photometering systems is formed on at least one detection area of the other said split photodetector of another of said plurality of photometering systems.

9. A photometering apparatus according to claim 8, wherein said split photodetectors have the same shape and size.

10. The photometering apparatus according to claim 8, wherein said photometering apparatus comprises a pair of photometering systems, wherein the ratios of the vertical and horizontal dimensions of each detection area of said light receiving devices and said insensitive areas are the same.

11. A photometering apparatus according to claim 10, wherein the magnification of said one of said plurality of photometering systems is less than the magnification of said another of said plurality of photometering systems.

12. A photometering apparatus according to claim 8, wherein said photometering apparatus is provided between an image erection system and an eyepiece in a finder optical system of a single lens reflex camera.

13. A photometering apparatus having a plurality of photometering systems for measuring the brightness of an object, wherein each said photometering system comprises:
   a light receiving device which receives light carrying the object image; and
   a photometering optical system for projecting said object image onto said light receiving device, said light receiving device receiving object light of different portions of said object; wherein
   said photometering optical systems have different magnifications.

14. The photometering apparatus according to claim 13, wherein each said photometering system comprises a light receiving device having a light receiving portion comprising detection areas which are separated by an insensitive area; wherein said photometering optical system of one of said plurality of photometering systems comprises a photometering lens which forms an image on said light receiving portion of said one of said plurality of photometering systems at a different magnification to a photometering lens of said photometering optical system of another of said plurality of photometering systems.

15. The photometering apparatus according to claim 14, wherein said photometering apparatus comprises a pair of photometering systems, wherein the ratios of the vertical and horizontal dimensions of said detection areas of said light receiving portion and said insensitive areas are the same.

16. A photometering apparatus comprising:
   a pair of split photodetectors for detecting different parts of an object image each of said split photodetectors being provided with a light receiver having detection areas which are separated by an insensitive area; wherein
   the ratios of the vertical and horizontal dimensions of said insensitive area of one of said pair of split photodetectors are the same as said detection areas of the other of said pair of split photodetectors.

* * * * *